Feb. 21, 1939.    H. A. SAMER    2,148,136
ELECTRIC FEEDER DISTRIBUTION SYSTEM
Filed July 13, 1938    3 Sheets-Sheet 1
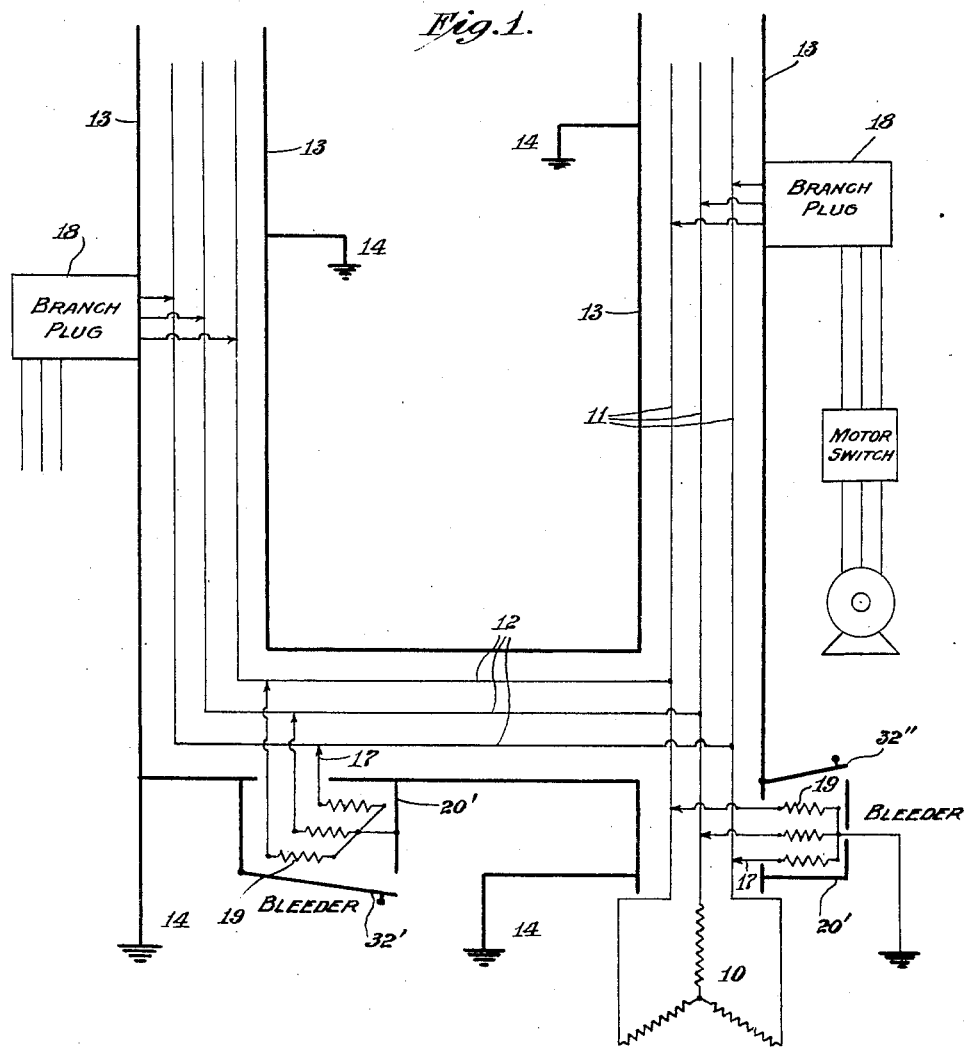
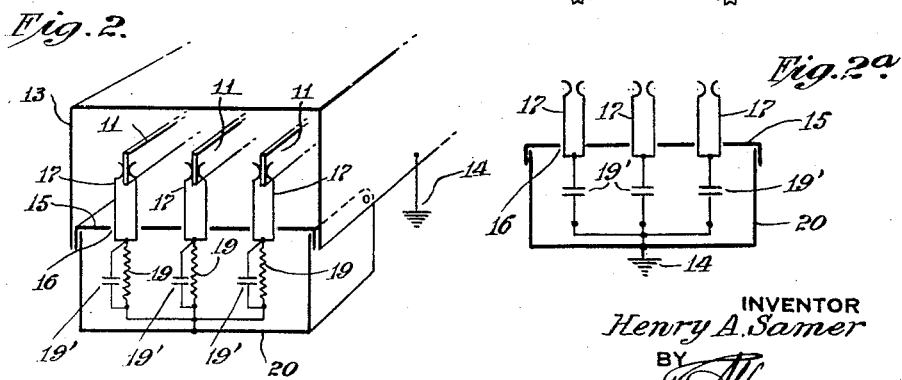
INVENTOR
Henry A. Samer
BY
ATTORNEY Feb. 21, 1939.  H. A. SAMER  2,148,136

ELECTRIC FEEDER DISTRIBUTION SYSTEM

Filed July 13, 1938  3 Sheets-Sheet 2

INVENTOR
Henry A. Samer
BY
ATTORNEY

Feb. 21, 1939.                H. A. SAMER                2,148,136
              ELECTRIC FEEDER DISTRIBUTION SYSTEM
                      Filed July 13, 1938           3 Sheets—Sheet 3
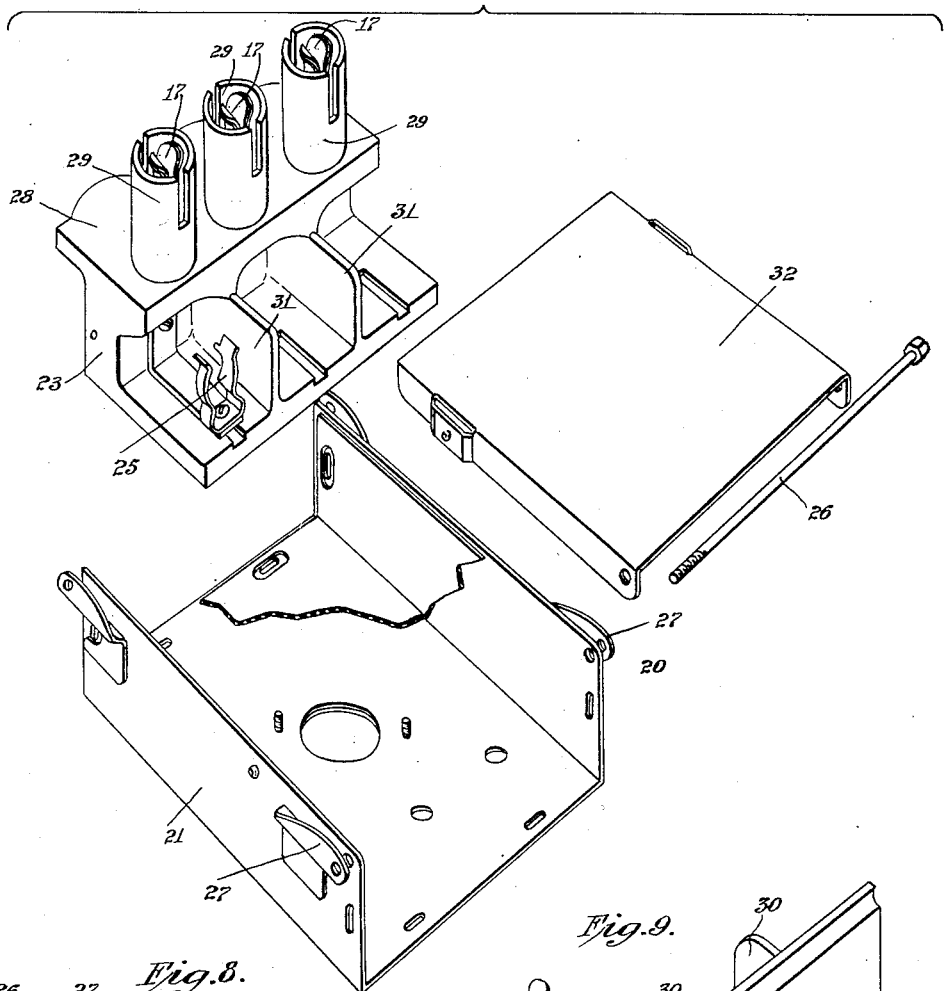
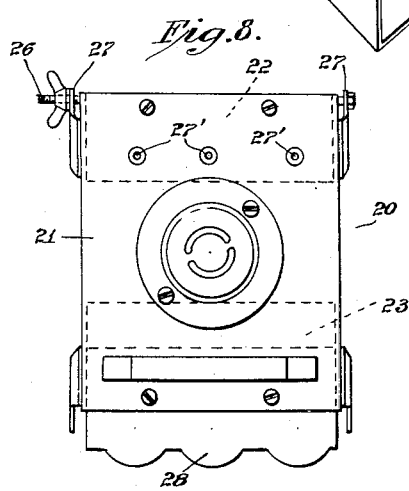
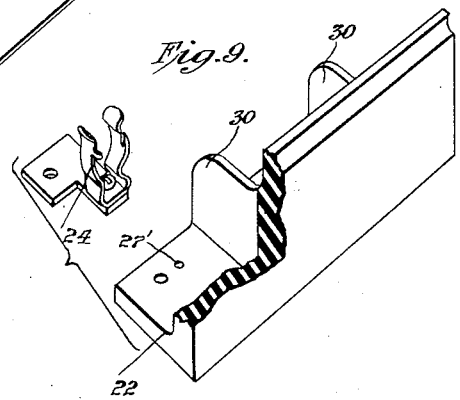
INVENTOR
Henry A. Samer
BY
ATTORNEY Patented Feb. 21, 1939

2,148,136

UNITED STATES PATENT OFFICE 2,148,136

ELECTRIC FEEDER DISTRIBUTION SYSTEM

Henry A. Samer, Ludlow, Ky., assignor to The Trumbull Electric Manufacturing Company, Plainville, Conn., a corporation of Connecticut Application July 13, 1938, Serial No. 218,965

6 Claims. (Cl. 175—294)

This invention relates particularly to power systems employing enclosed bus bars—or duct systems in which branch circuits are connected at various intervals.

In such systems branch plug-in devices are usually employed embodying protective fuses. The branch circuit motors are also usually protected by motor starting switches.

When such power system is operated without grounding, the system has a certain capacity to ground. The greater this capacity the greater the charge which may accumulate on the ungrounded system. The charge may be due to static electricity from nearby driving belts or similar sources or from charges induced by lightning. Since $Q=CE$ where $Q=$the charge, $C=$the capacity and $E=$the voltage, for a given fixed capacity, the voltage of the system with respect to ground will be proportional to the accumulated charge. That is, as the system charges up, the voltage to ground builds up.

The voltage between the system and ground may be sufficient to arc to ground. An initial static discharge may also ionize the air near the bus bars sufficiently to cause the power line current to arc between the bus bars. When this happens considerable damage to the system may result.

In the larger number of cases, the electrostatic charge comes directly from a transformer bank itself, because if ungrounded the transformer is in effect a series condenser.

The ordinary fuses and switches unfortunately do not always protect the bus bars within the conduit or enclosure. Under severe conditions there is liable to be a flash-over from one bus bar to another within the enclosure, and this flash-over may be aided by warping of the bus bars between the insulating supports. When a flash-over occurs, the bus bars and the enclosure may be badly damaged or destroyed by the arc. To protect the bus bars and the enclosure from these possible flash-overs, the present invention was designed.

If a leakage or "bleeder" path is provided between the system and ground of such value as to bleed the static charge to ground faster than it can build up, no voltage can build up to cause damage. Wire wound resistors of the order of 15,000 ohms have been found to discharge static charges at a satisfactory rate and still draw little power from the power line even on a 600 volt system.

This then covers protection from the accumulation of static charges or charges induced by lightning.

The system may also be protected from heavy surges due to switching or load interruption by the use of "Thyrite" resistors in place of the ordinary resistors described above. This material has the property of decreasing its resistance as the voltage across it builds up and hence the greater the surge the greater the current taken by the protective resistor. Obviously, devices of this construction may be provided with resistors of ordinary type or of the Thyrite type or both types of resistors may be combined in a single device.

It will be found that where electrostatic disturbances are the main abnormalities to contend with, ordinary resistors may be used with the system. If surge voltages have to be guarded against, the "Thyrite" resistor is recommended.

The present type of system has a metal duct or enclosure, which is grounded for safety's sake at a number of points along its length. Not only is the bus bar enclosure grounded, but the metal boxes containing branch take-off plugs are firmly connected to the bus bar enclosure and also grounded.

One method of grounding the resistors is by linking the terminals together with wires and then connecting these combined terminals to a lug on the inside of the box of the plug. Because the plug box is connected to ground through the bus bar enclosure, the connection of the resistors to this lug in the box will ground the resistors. Another method of grounding would be to connect the resistor terminals to a cable which would be fastened outside of the plug to some proper ground.

The drawings illustrate the invention as applied to a feeder distribution system with a special protective device in the form of a hinged box or receptacle containing the grounded resistors with contacts adapted to be plugged into the conduit or duct to engage the bus bars.

Fig. 1 is a diagrammatic view of one form of system embodying my invention with bleeders shown diagrammatically.

Fig. 2 is a fragmentary detail showing one form of duct on a small scale with Thyrite and ordinary resistor protective bleeder devices.

Fig. 2a shows a modified form of branch box with Thyrite bleeders.

Fig. 7 is a dropped or exploded perspective view showing the principal parts of one of the bleeder plug boxes.

Fig. 8 is a back or outside view of one of the boxes shown on a smaller scale.

Fig. 9 is a detail perspective view showing a fuse clip and a part of its support.

Figure 5:
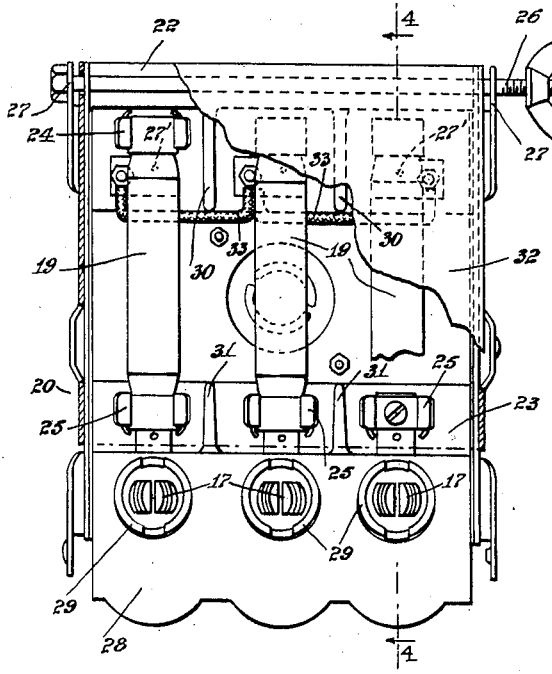
Fig. 5 is a face view of one of the bleeder plug boxes with its cover partially broken away.
Figure 6:
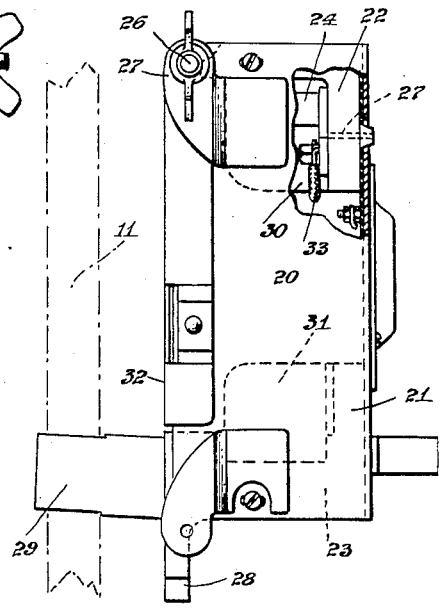
Fig. 6 is a side view of the same, part being broken away to show the inside and showing a bus bar in dot and dash lines.
Figure 3:
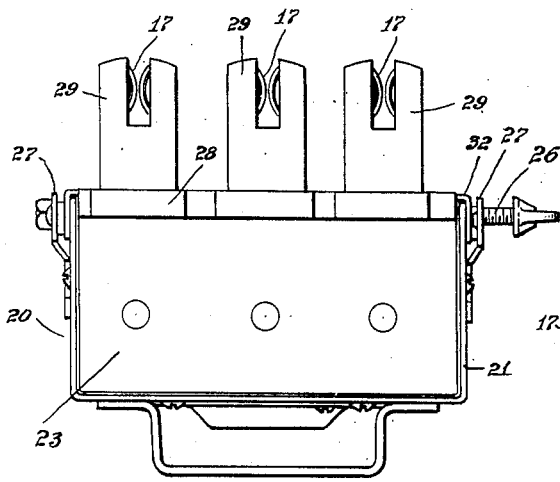
Fig. 3 is an end view of one of the bleeder plug boxes.
Figure 4:
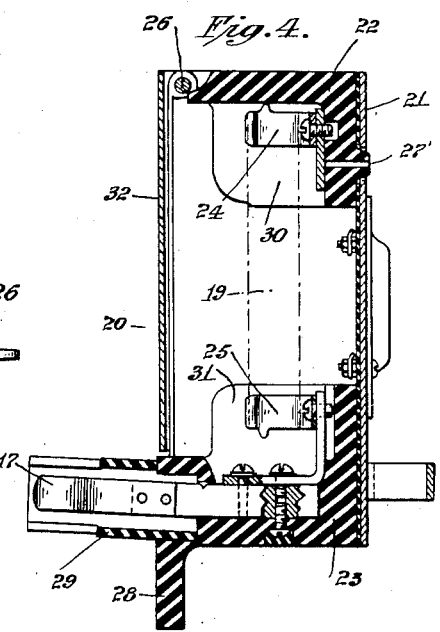
Fig. 4 is a longitudinal sectional view of the same on the plane on the line 4—4 of Fig. 5.

A conventional system is illustrated in Fig. 1 where 10 is a source of power of any suitable type connected in any suitable manner to main bus bars 11 and branch bus bars 12, enclosed respectively in metallic ducts 13 grounded for instance at 14, 14. The bottom plate 15 of the duct or conduit is provided with suitable openings such as 16 (Fig. 2) as usual for the introduction of the usual contact blades, stabs or jaws 17 such as are carried by branch connectors or plugs for engagement with the bus bars. Such systems usually employ insertable and removable plugs 18, 18 for connection to branch circuits.

The protective devices have similar contact members 17, 17 with resistors 19, 19 connected at one end of each to a contact and connected together at the opposite ends and to ground either directly or through the receptacle 20 and the duct 13.

The receptacle consists of a U-shaped channel portion or main casing 21 with insulating pieces 22 and 23 at the ends carrying the terminal clips 24 and 25 for the resistors 19 and the contact members 17 respectively.

The receptacle is hinged to the conduit by a hinge pin 26 which passes through the ears 27 and side walls of 21.

The insulating end block 22 is of L-shaped section with its base secured to the bottom of the channel 21 and its upright closing the end. The clips 24 are secured to the base of the block which has holes 27' to permit of testing the circuit. The other block 23 also has a base secured in the channel 21 and an end wall. The latter has a flange 28 which overlaps the edges of the openings 16 in the bottom plate 15 of the duct and tubular slotted guards 29 which surround the contacts 17 and are slotted to receive the bus bars. Insulating partitions such as 30 and 31 are preferably provided between adjacent terminals or clips on the end pieces.

I also preferably provide a cover plate 32 which is hinged between the duct and the protective box for instance on the same hinge pin 26 which carries the receptacle or box itself.

The receptacle must be retracted so as to break the circuit before the cover 32 can be opened and before access can be had to the resistors. Vice versa the cover 32 will be closed either before the receptacle is swung into contact-making position or at the same time.

In the arrangement shown in Fig. 5 the ends of the resistors most remote from the contact member 17, 17 are connected together by wires 33 and thence to ground either through the wall of the receptacle 20 and the duct 13 as shown in Fig. 2 and at the lower left hand in Fig. 1 or directly to ground as shown at the lower right hand of Fig. 1.

In the latter figure the covers 32' and 32" are arranged at different portions of the protective devices 20' and 20" respectively.

It is recommended that these protective plugs be inserted as near as possible to the source end of the system they are designed to protect. Thus I have shown one of these plugs at the beginning of the main duct of the system at the lower right of Fig. 1, and another at the beginning of a branch duct in the system at the lower left of Fig. 1.

In use, these protective plugs do not take off power like the ordinary branch circuit plugs. Of course, the resistors will always drain off a small amount to ground, and for this reason these plugs have become known as "bleeder" plugs. However, the resistance to this "bleeding" is quite great, and the efficiency of the system is not much impaired by the loss. Upon emergency voltage overload conditions arising, the resistors, being conductors to a limited degree, will bleed damaging excesses directly to ground. Thus the bus bars in the system will be protected against damaging surges because the greater portion of such surges will be "bled" to ground.

Some of the advantages, of using a removable plug for carrying these resistors, are apparent from the above. Another advantage is the fact that with a removable plug the resistors can be easily and safely installed, inspected and renewed without danger to the workman and without interrupting the service.

While I have described my protective system as applied to a three-wire circuit, certain advantages may be had from a use of the principle in a two-wire circuit or a single circuit or it may be used to protect each individual pole of a multipolar circuit independently of the other circuits.

In Fig. 1 I have shown what may be termed ordinary resistors 19 while in Fig. 2a I have shown diagrammatically Thyrite resistors 19'. In Fig. 2 both types of resistors 19 and 19' are indicated.

I claim:

1. In an electrical power distribution system having an elongated metal enclosure which is grounded and an elongated current carrying bus bar enclosed within but insulated from the enclosure, a protective device including a metallic receptacle removably mounted on said enclosure, a bus bar contact carried by but insulated from said receptacle, and an electrical resistor in the receptacle electrically connected at one end to said contact and electrically connected at the other end to said receptacle.

2. In an electrical power distribution system having bus bars enclosed in a duct, a protective device including a receptacle removably mounted on the duct, a bus bar contact carried by said receptacle and an electrical resistor in the receptacle electrically connected at one end to the contact and electrically connected at the other end to ground.

3. In an electrical distribution system having a metallic duct with bus bars mounted therein and insulated therefrom and from each other, a protective device including an enclosing receptacle containing high resistance devices connected together and grounded at one end of each device and each protective device being separately connected at its other end to one of the respective bus bars to which no other one of said protective devices is connected.

4. In an electrical distribution system having a metallic duct with bus bars therein, a protective device including a receptacle movably connected to the duct and Thyrite resistors in said receptacle and detachably connected at one end of each resistor to a correlated bus bar to which no other of said resistors is connected and connected at the other end of each to ground.

5. In an electrical distribution system having a bus bar duct with enclosed bus bars and a protective device having a grounded metallic receptacle and non-inductive resistors in said receptacle and each resistor being separately connected at one of its ends to a corresponding one of a bus bar and each resistor being electrically connected at its other end to a grounded circuit.

6. In an electrical distribution system having a metallic duct and at least one conductor mounted within said duct but separated therefrom by a dielectric permitting substantially no leakage therebetween, a protective device including an enclosing receptacle containing therein an electrical resistance device connected at its two extremities to said duct and said conductor respectively, and also connected at one extremity to the ground, whereby a leakage path across said dielectric and to the ground is provided.

HENRY A. SAMER.